(12) United States Patent
Balog

(10) Patent No.: US 11,313,780 B2
(45) Date of Patent: Apr. 26, 2022

(54) DEVICES AND METHODS FOR ANALYZING AND FILTERING LIGHT SCATTERING DATA FROM A SAMPLE POTENTIALLY CONTAINING A NON-TARGET COMPOUND

(71) Applicant: ADOLPHE MERKLE INSTITUTE, UNIVERSITY OF FRIBOURG, Fribourg (CH)

(72) Inventor: Sandor Balog, Fribourg (CH)

(73) Assignee: ADOLPHE MERKLE INSTITUTE, UNIVERSITY OF FRIBOURG, Fribourg (CH)

( * ) Notice: Subject to any disclaimer, the term of this patent is extended or adjusted under 35 U.S.C. 154(b) by 0 days.

(21) Appl. No.: 17/258,293

(22) PCT Filed: Jul. 11, 2019

(86) PCT No.: PCT/EP2019/068753
§ 371 (c)(1),
(2) Date: Jan. 6, 2021

(87) PCT Pub. No.: WO2020/011949
PCT Pub. Date: Jan. 16, 2020

(65) Prior Publication Data
US 2021/0270712 A1    Sep. 2, 2021

Related U.S. Application Data

(60) Provisional application No. 62/697,486, filed on Jul. 13, 2018.

(51) Int. Cl.
*G01N 15/02* (2006.01)
*G01N 21/51* (2006.01)
(Continued)

(52) U.S. Cl.
CPC ......... *G01N 15/0211* (2013.01); *G01N 21/51* (2013.01); *G01N 21/82* (2013.01); *G01N 21/532* (2013.01); *G01N 2015/0222* (2013.01)

(58) Field of Classification Search
CPC .... G01N 15/02; G01N 15/0211; G01N 21/51; G01N 21/82; G01N 21/532; G01N 2015/0222
(Continued)

(56) References Cited

U.S. PATENT DOCUMENTS

2012/0281215 A1   11/2012  Peters
2018/0266931 A1*  9/2018  Corbett .............. G01N 15/0211
(Continued)

FOREIGN PATENT DOCUMENTS

| EP | 3279635 A1 | 7/2018 |
|----|------------|--------|
| WO | 2015025947 A1 | 2/2015 |
| WO | 2017051149 A1 | 3/2017 |

OTHER PUBLICATIONS

Streets, A., Simultaneous Measurement of Amyloid Fibril Formation by Dynamic Light Scattering and Fluorescence Reveals Complex Aggregation Kinetics, PLOS ONE, Jan. 2013, vol. 8, Issue 1, pp. 1-10, www.plosone.org.
(Continued)

*Primary Examiner* — Roy M Punnoose
(74) *Attorney, Agent, or Firm* — Hudak, Shunk & Farine Co. LPA

(57) ABSTRACT

Methods of analyzing and filtering light scattering data from a sample potentially containing a non-target compound, for example a contaminant. The presence of contaminants result in outliers in the scattering intensity data that increase both symmetry and width of photon counts obtained via analysis. After identification, various outliers are discarded to account for the non-target compounds and thereafter the remaining
(Continued)

light scattering data is analyzed. Preferably, analyzing the light scattering data or photon counts involves determining a level to discard an outlier. In particular, the method includes the steps of identifying and quantifying the mode of photon count distribution and using the peak of the mode of distribution to eliminate outliers.

19 Claims, 13 Drawing Sheets

(51) Int. Cl.
  *G01N 21/82* (2006.01)
  *G01N 21/53* (2006.01)
(58) Field of Classification Search
  USPC .......................................................... 356/336
  See application file for complete search history.

(56) References Cited

U.S. PATENT DOCUMENTS

| | | | |
|---|---|---|---|
| 2019/0242805 A1* | 8/2019 | Corbett | G01N 15/0211 |
| 2019/0317002 A1* | 10/2019 | Corbett | G01N 15/0211 |
| 2021/0208047 A1* | 7/2021 | Corbett | G01N 15/0211 |

OTHER PUBLICATIONS

Barber, P. W., Rayleigh-Gans-Debye Applicability to Scattering by Nonspherical Particles, Applied Optics, Mar. 1, 1978, vol. 17, No. 5, pp. 797-803.

Barber, P. W., Rayleigh-Gans-Debye Applicability to Scattering by Nonspherical Particles: Corrigenda, Applied Optics, Apr. 1, 1979, vol. 18, No. 7, pp. 962-963.

Blauer, G., Research Communication On the Preparation of β-haematin, Biochemical Journal, 2000, vol. 346, pp. 249-250, Biochemical Society.

Pecora, R., Dynamic Light Scattering, Applications of Photon Correlation Spectroscopy, 1985 Plenum Press, New York, pp. 1-420.

Bossert, D., Hypothesis Test of the Photon Count Distribution for Dust Discrimination in Dynamic Light Scattering, Analytical Chemistry, 2018, vol. 90, pp. 3656-3660.

Bossert, D., Speckle-Visibility Spectroscopy of Depolarized Dynamic Light Scattering, The Journal of Physical Chemistry, 2017, pp. 7999-8007.

Coronado, L.M., Malarial Hemozoin: From Target to Tool, Biochimica et Biophysica Acta, 2014, pp. 2032-2041, Elsevier, B.V.

Fidock, D.A., Antimalarial Drug Discovery: Efficacy Models for Compound Screening, Nature Reviews, Jun. 2004, vol. 3, pp. 509-520.

Gildenhuys, J., The Single Crystal X-ray Structure of β-Hematin DMSO Solvate Grown in the Presence of Chloroquine, a β-Hematin Growth-Rate Inhibitor, Journal of the American Chemical Society, 2013, vol. 135, pp. 1037-1047; ACS Publishing.

Gisler, T., Mode-Selective Dynamic Light Scattering: Theory Versus Experimental Realization, Applied Optics, Jun. 20, 1995, vol. 34, No. 18, pp. 3546-3553, Optical Society of America.

Goodman, J.W., Statistical Optics, Wiley Classics Library Edition, 2000, pp. 1-550, Wiley Interscience, NY, NY.

Klein, E.Y., Antimalarial Drug Resistance: A Review of the Biology and Strategies to Delay Emergence and Spread, International Journal of Antimicrobial Agents, 2013, vol. 41, pp. 311-317, Elsevier B.V.

Kolluri, N., Towards Lab-On-A-Chip Diagnostics for Malaria Elimination, Lab on a Chip, 2018, vol. 18, pp. 75-94, Royal Society of Chemistry.

Murray, C., Global Malaria Mortality Between 1980 and 2010: A Systematic Analysis, The Lancet, 2012, vol. 379, pp. 413-431.

Pagola, S., The Structure of Malaria Pigment β-Haematin, Nature, Mar. 16, 2000, vol. 404, pp. 307-310.

Pandey, A.V., Assay of β-Hematin Formation by Malaria Parasite, Journal of Pharmaceutical and Biomedical Analysis, 1999, vol. 20, pp. 203-307, Elsevier B.V.

Sandlin, R.D., Identification of β-Hermatin Inhibitors in a High-Throughput Screening Effort Reveals Scaffolds With in vitro Antimalarial Activity, International Journal for Parasitology: Drugs and Drug Resistance, 2014, vol. 4, pp. 316-325, Elsevier.

Sigala, P. A., The Peculiarities and Paradoxes of Plasmodium Heme Metabolism, Annual Review of Microbiology, 2014, vol. 68, pp. 259-278.

Sinha, S., Development in Assay Methods for In Vitro Antimalarial Drug Efficacy Testing: A Systematic Review, Frontiers in Pharmacology, Oct. 2017, vol. 8, Article 754, pp. 1-14.

Sullivan, D.J., On the Molecular Mechanism of Chloroquine's Antimalarial Action, Proc. Natl. Acad. Sci. USA, Oct. 1996, vol. 93, pp. 11865-11870.

Weissbuch, I., Interplay Between Malaria, Crystalline Hemozoin Formation, and Antimalarial Drug Action and Design, Chem. Rev., 2008, vol. 108, pp. 4899-4914, American Chemical Society.

White, N.J., Antimalaria Drug Resistance, The Journal of Clinical Investigation, Apr. 2004, vol. 113, No. 8, pp. 1084-1092.

* cited by examiner

DEVICES AND METHODS FOR ANALYZING
AND FILTERING LIGHT SCATTERING
DATA FROM A SAMPLE POTENTIALLY
CONTAINING A NON-TARGET COMPOUND

The present invention relates to methods of analyzing and filtering light scattering data from a sample potentially containing a non-target compound, for example a contaminant. The presence of contaminants result in outliers in the scattering intensity data that increase both symmetry and width of photon counts obtained via analysis. After identification, various outliers are discarded to account for the non-target compounds and thereafter the remaining light scattering data is analyzed. Preferably, analyzing the light scattering data or photon counts involves determining a level to discard an outlier. In particular, the method includes the steps of identifying and quantifying the mode of photon count distribution and using the peak of the mode of distribution to eliminate outliers.

In a particularly useful embodiment the method further includes the step of combining a test compound to be studied for an inhibiting or enhancing effect on a target compound. In one application, the efficacy of a compound having the potential to function as a drug utilizing the statistical analysis of the depolarized component of coherent laser light scattered elastically from a sample, such as one including either growing or dissolving hemozoin crystals subjected to Brownian motion in a suitable liquid. The methods are useful to analyze the kinetics of hematin crystallization in the presence of a compound being screened as a potential antimalarial drug. Malaria is caused by *Plasmodium* sp. parasites transmitted by infected female *Anopheles* sp. mosquitoes. The survival of the parasites in the host relies on detoxifying free heme by biocrystallization into insoluble crystals called hemozoin. This mechanism of self-preservation is targeted by antimalarial drugs, which are screened and selected based on their capacity to inhibit the formation of hemozoin crystals.

Therefore, experimental methods disclosed herein, which are capable of characterizing accurately the kinetics of crystal formation and removing outliers, are valuable. Relying on the optical anisotropy of hemozoin, the methods disclosed herein include the step of assessing the kinetics of crystal formation through the statistical analysis of photon counts of static light scattering (SLS), dynamic light scattering (DLS) and dynamic depolarized light scattering (DDLS). In order to illustrate the effectiveness of the methods disclosed herein, the growth kinetics of hemozoin crystals are assessed without and in the presence of a known antimalarial drug (chloroquine, CQ), which provided for distinct, measurable characterization of nucleation and crystal growth, wherein the outliers have been accounted for and discarded.

BACKGROUND OF THE INVENTION

Malaria is a deadly disease[1] of the blood that is caused by *Plasmodium* sp. parasites, which are transmitted from person to person by infected female *Anopheles* sp. mosquitoes. Inside red blood cells, the parasite degrades and digests hemoglobin to supply its own metabolism.[2-3] During this process, the parasite releases a non-digested molecule: heme. Heme is highly toxic to the parasite and disrupts the function of its cell membrane, which would result in cell lysis and ultimately self-digestion.[4] To prevent this, the parasite neutralizes heme by biocrystallization: the oxidation and dimerization of heme is followed by a well-defined self-assembly through hydrogen bonding and stacking into a triclinic crystal structure (FIG. 1).[5]

Given that hemozoin crystallization is an elementary mechanism in the detoxification of heme, a key concept defining the quinoline-class antimalarial drugs is the inhibition of hematin self-assembly. While this approach has an acknowledged history in antimalarial chemotherapy, drug resistance has reemerged and has become responsible for the increase in malaria-related mortality, in particular in Africa.[6-7] Drug discovery necessitates high-throughput assays[8] of new compounds and a profound understanding of the mechanism and kinetics of crystallization and its inhibition.[5, 9-10] The availability of synthetic hemozoin—β-hematin, whose physical properties, including structural optical and magnetic properties, are identical to hemozoin isolated from the parasite[11]—has accelerated the investigations.[12]

SUMMARY OF THE INVENTION

In view of the above, problems of the present invention were the need to understand the mechanism and kinetics of precipitation, such as crystallization, and dissolution of a target compound and further how to assess performance of various compounds to one or more of inhibit and enhance the same.

An additional problem was that currently used high-throughput assays (dominantly: colorimetric assays) are unable to provide information about crystal dimensions (growth rate) and concentration (nucleation rate).

The problems noted above and others are solved by the methods disclosed herein which analyze and filter light scattered from a sample containing a target compound and potentially one or more non-target compounds to provide information about crystal dimensions (growth rate) and concentration (nucleation rate), while removing effects caused by one or more outliers. In various embodiments, the methods comprise the steps of statistically analyzing light, in particular laser light, via one or more of static light scattering (SLS), dynamic light scattering (DLS), and depolarized dynamic light scattering (DDLS), that is scattered elastically from a sample, which for example contains nanoparticles, proteins, etc., subjected to Brownian motion in a liquid, for example a colloidal suspension, dispersion, etc. and removing outliers potentially caused by non-target compounds. The methods exploit certain mathematical properties universal to the mentioned types of elastic scattering of temporally and spatial coherent light.

The methods of the present invention analyze light scattering data, namely photon counts, to determine how to discard one or more outliers and include the steps of identifying and quantifying the mode of the photon count distribution, which is defined as the most likely value to find in a sample of a given set of photon counts, and using the value of this mode of distribution to eliminate the outliers.

In order to illustrate the benefits of the methods of the present invention, examples are presented herein which analyze the kinetics of hematin crystallization without as well as in the presence of a compound known as a potential antimalarial drug. The applicability of elastic light scattering, such as by DDLS, is granted by the self-assembly of heme and hemozoin, that is, self-assembly is strictly orientation-specific and ensures that anisotropy is a long-range feature being several orders of magnitude beyond the size of the molecule. The hemozoin crystals present an elongated needle or brick-like (parallelepiped) morphology, which means, that the optical refractive index, and thus, polarizability is different along the directions defined by stacking and hydrogen bonding, respectively. Accordingly, the elements of the polarizability tensor are not identical. Due to this anisotropy in the polarizability, the polarization vector of the scattered light is not equal to the polarization vector of the laser light illuminating the hemozoin crystal, and the scattered light contains a 'depolarized' component (vh) perpendicular to the original polarization (vv) of the laser.

Therefore, upon translational and rotational diffusion, the amplitude of depolarized scattering will fluctuate, and the rate and amplitude of the fluctuation of the scattering intensity will carry information about Brownian dynamics and particle size. It has been shown before that the statistical analysis of the photon count distribution of the scattered light describes accurately Brownian dynamics.[13-14] Therefore, we used this technique to follow the self-assembly and growth of hemozoin crystals without and in the presence of CQ, wherein the technique determines whether or not one or more outliers are present and if so, taken into account.

The distribution of photon counts (n) of depolarized dynamic light scattering is[15]

$$P(n) = \binom{n+M-1}{M-1} \cdot \left(1 + \frac{M}{\langle n \rangle}\right)^{-n} \cdot \left(1 + \frac{\langle n \rangle}{M}\right)^{-M}. \quad (1)$$

$\langle n \rangle$ is linearly proportional to the mean intensity of depolarized scattering ($I_{vh}$) and M is a function of the Brownian dynamics of the particle ($\Gamma$) and the time interval used to count the photons ($\tau$):

$$M(\Gamma, \tau) = \frac{2 \cdot (\Gamma \cdot \tau)^2}{e^{-2 \cdot \Gamma \cdot \tau} + 2 \cdot \Gamma \cdot \tau - 1}. \quad M(\Gamma, \tau) = \Gamma \cdot \tau \text{ when } \Gamma \cdot \tau \gg 1. \quad (2)$$

The Brownian dynamics of the particle is described by its rotational ($D_R$) and translational ($D_T$) diffusivity[16]

$$\Gamma = 6 \cdot D_R + q^2 \cdot D_T \quad (3)$$

where $q = 4\pi/\lambda n_s \sin(\theta/2)$ is the momentum transfer, with $\theta$ being the scattering angle, $\lambda$ the wavelength of the scattered waves and $n_s$ the refractive index of the solution.[16] When $\langle n \rangle \gg M$, (where $M \geq 1$ always) the negative binomial distribution (Equation 1) may be substituted by the gamma distribution, $$P(\alpha, \beta, n) = \frac{e^{-\frac{n}{\beta}} n^{\alpha-1} \cdot \beta^{-\alpha}}{\text{Gamma}[\alpha]},$$

with the following parameters:

$$\alpha = \frac{M \langle n \rangle}{M + \langle n \rangle} \cong M \text{ and } \beta = \frac{M + \langle n \rangle}{M} \cong \frac{\langle n \rangle}{M},$$

and Gamma[$\alpha$] is the gamma function with argument $\alpha$. Using the concept of hydrodynamic radius—defined as the radius of a sphere with an equivalent diffusivity we can determine the hydrodynamic radius of the hemozoin crystal $$D_R = \frac{k_B T}{8 \pi \eta} \frac{1}{R^3} \quad (4)$$

$$D_T = \frac{k_B T}{6 \pi \eta} \frac{1}{R} \quad (5)$$

where R is the hydrodynamic radius, $k_B$ the Boltzmann constant, T the temperature, $\eta$ the viscosity of the solution. Starting from Equation 1, it can be shown that there is a fundamental relationship between M, the variance, and the mean of the photon count distribution:

$$\langle n^2 \rangle - \langle n \rangle^2 = \langle n \rangle + \frac{\langle n \rangle^2}{M} \quad (6)$$

where $$\langle n^f \rangle \equiv \sum_{n=0}^{\infty} n^f \cdot P(n). \quad (7)$$

The essence of Equation 1-7 is that the mean and variance of the photon count distribution of the fluctuations of the depolarized component of the scattered light describes quantitatively Brownian dynamics, and therefore, based on the optical anisotropy of β-hematin, the mean and variance of P(n) is expected to be dependent on $q^2$. To test this, we recorded depolarized scattering of a dilute suspension of β-hematin, and analyzed P(n) at several angles (15°, 20° . . . 45°, Experimental Section). We used a laser wavelength of λ=660 nm, where light absorption of hemozoin is low (FIG. 2a). FIG. 2b shows the traces of photon counts recorded at a sampling rate of 19 Hz at the different angles. Both the mean and the amplitude of the fluctuations decreases with the angle of scattering. FIG. 2c shows the corresponding photon count distributions, and FIG. 2d shows the relaxation rate Γ—determined at each angle via Equation 1 and 7—which exhibits a linear dependence on $q^2$. β-hematin is therefore indeed suitable for light scattering, in particular DDLS analysis.

To follow the self-assembly depicted in FIG. 1, β-hematin was dissolved in sodium hydroxide, and the addition of acetic acid triggered the isothermal recrystallization (Experimental Section). In the first experiment, the self-assembly and recrystallization of β-hematin was triggered alone, and in the second experiment, the recrystallization of β-hematin was triggered in the presence of CQ. TEM images—taken by isolating hemozoin after 30 minutes of recrystallization time—show that self-assembly indeed resulted in crystallization (FIG. 3), and consequently, depolarization is the outcome of light scattering from reassembled β-hematin.

FIG. 4a) shows the two 30-minutes-long traces of photon counts recorded at a sampling rate of 19 Hz. A 30-second-long period of the second trace—divided into three 10-second-long parts—is shown in FIG. 3b). The corresponding photon count distributions and first two raw moments of P(n) are shown in FIGS. 4c) and d), respectively. The full length of the photon count traces were analyzed via Equation 1-7 in terms of mean scattering intensity ($I_{vh} = \langle n \rangle$) and relaxation rate (Γ).

FIGS. 5a) and b) shows that $I_{vh}$ increases and Γ decreases with crystallization time. The crystallization of β-hematin in the presence of CQ is initially rapid but considerably slows down after 3-4 minutes, and after 20 minutes, the crystallization practically levels off. The crystallization kinetics of β-hematin without CQ displays a quite different kinetic: the initial rate of crystallization is moderate but the crystals form and grow steadily.

To understand the meaning of these observations, we adopt the approximation of the Rayleigh-Ganz-Debye (RGD) theory.[17] The mean intensity may be expressed as $I_{vh} \propto C \cdot V^2$, where C is the concentration and V is the volume of the β-hematin crystals. The volume of the particle is proportional to the hydrodynamic volume, which may be expressed by the hydrodynamic radius (R, FIG. 5c)) as $V=4/3\pi \cdot R^3$, where R is determined from Γ (Equation 3). The formation of the crystals results from nucleation and growth. First, nuclei form and lose and gain molecules until a specific critical size is reached, from where growth occurs. V is proportional to the degree of growth, and the concentration of β-hematin (C) is proportional to the concentration of the nuclei. Accordingly, the concentration of crystals may be expressed as $C \propto I_{vh}/R^6$. Thus, we estimate the ratio of the concentrations of β-hematin crystals grown in the presence of CQ and without CQ as $N=C_{with\ CQ}/C_{woCQ}$. FIGS. 5c and d show that in the presence of CQ the number of nuclei is higher, but the crystals do not reach the same volume as without CQ, which is in complete agreement with the picture that the drug-heme complex negatively affects crystal formation.[18] The presence of dust and the consequent outliers in the scattering intensity increase both asymmetry and width of the photon counts obtained via the experiments. Accordingly, by only examining the statistical moments, such as the mean and the variance, to spot and remove outliers is unreliable (biased and inaccurate) when P(n) is already asymmetric and broad. For example, at the tail of the distribution, bad counts (outliers) may be closer to good counts of low probability but nonetheless resulting from coherent scattering.

To get around this difficulty, we identify and quantify a characteristic and easily recognizable feature of good photon counts: the mode of the distribution. The mode of the distribution—defined as the most likely value to find in a sample of a given set of photon counts—is equal to $$M + \langle n \rangle \left(1 - \frac{1}{M}\right).$$

It marks the peak of P(n) where P(n) takes its maximum value. The mode is characteristic and quantifiable position, even if P(n) is asymmetric and broad, and it is not affected by outliers, see FIG. 8.

To characterize particle size and Brownian dynamics, we need to determine the parameters of the probability density of the photon counts: α and β. In the presence of outliers (due to non-coherent scattering from non-target compounds), such as contaminants, such as but not limited to, dust particles, foreign matter, impurities, aggregates, and scatter from a medium, the experimentally obtained probability density of the photon counts may be strongly altered (usually skewed and broadened), and thus the characterization becomes strongly biased. Herein, a procedure that identifies and remove outliers, without bias is described.

Static light scattering (SLS) experiment aims at determining accurately $\langle n \rangle$ as function of the scattering angle. Dynamic light scattering (DLS/DDLS) experiment aims at determining accurately 'apparent' Brownian dynamics (via M(Γ, τ)) as a function of the scattering angle.

The following steps are utilized to remove outliers in various embodiments:
1. Power transform (a nonlinear and monotonic transformation) the photon counts: $y=n^F$, where F is a real number. It is easy to show, via the rule of transforming random variables, that $$P(\alpha, \beta, y) = \frac{e^{-\frac{y^{\frac{1}{F}}}{\beta}} y^{-1+\frac{\alpha}{F}} \beta^{-\alpha}}{F\ \text{Gamma}[\alpha]}$$

where α and β are $$\alpha = \frac{M \langle n \rangle}{M + \langle n \rangle} \text{ and } = \frac{M + \langle n \rangle}{M}.$$

If $\langle n \rangle \gg M$, α=M and $$\beta = \frac{\langle n \rangle}{M},$$

and thus the mode of this distribution is $y=M^{-F}(M\langle n \rangle - F(M+\langle n \rangle))^F$. If $\langle n \rangle \gg M \gg F$, y (mode)$\cong \langle n \rangle^F$. Therefore, by determining the mode, we estimate the first parameter of the photon count distribution.

2. F is chosen in a way that the skewness of the distribution of y becomes zero, and fitting a simple symmetric function (e.g. a Gaussian) against the distribution of y can certainly determine the mode. From the mode, estimate $\langle n \rangle$. Once $\langle n \rangle$ is estimated this way, fit P(α,β, n) against the distribution of photon counts. The fit is to be constrained by knowing $\langle n \rangle$. Both α and β are function of $\langle n \rangle$. If the level of the noise is not high (e.g. the number of outliers is below 3%), this step can already determine M, Brownian dynamics with sufficient accuracy.

3. If the noise level is high, e.g. the number of outliers is above 10%, use the fit obtained at step 2 (P(α,β,n)) to establish a confidence interval (CI, aka probability interval or probability level), e.g. CI=0.95 or 0.99, and define the corresponding value of n as a threshold. For this, use the cumulative distribution function of $$P(\alpha, \beta, y)\left(= 1 - \frac{\text{Gamma}\left[\alpha, \frac{n}{\beta}\right]}{\text{Gamma}[\alpha]}\right),$$

where $$\text{Gamma}\left[\alpha, \frac{n}{\beta}\right]$$

is the upper incomplete gamma function. Any value of the time series being above this threshold will be discarded. With this step, we exclude photon-count events that are of low probability (e.g. below 5% or 1%), according to the value of $\langle n \rangle$ determined in Step 1 and 2.

4. In the last step, fit the remaining values again with P(α,β,n) to obtain the 'true' M and $\langle n \rangle$. In step 3 we might also discard good data (analogous to false positive, type-1 error in hypothesis testing), but this has a practically zero impact when fitting against the shape of the distribution if CI≥0.95.

The steps of this algorithm can be easily programmed and run unsupervised. Modifications obvious to one of ordinary skill in the art or other methods that determine the mode of the distribution can be utilized.

To demonstrate, we simulated and analyzed a time series with outliers, see FIGS. 9 to 13. Using simulation, the true parameters are known exactly, and thus, the efficiency of the process was tested. A flow chart describing the steps of the process for identifying and removing outliers is set forth in FIG. 14.

As utilized herein, an outlier generally refers to any observation in a set of data that is inconsistent with the remainder of the observations in that data set. The outlier is inconsistent in the sense that it is not indicative of possible future behavior of data sets coming from the same source. Outliers may be due to contaminants, spurious or rogue observations, or discordant values. Valid inferences concerning a particular data set can only be made once one first determines which observations, if any, are potential outliers, and how these observations should be treated in the subsequent analysis.

The methods of the invention utilizing DDLS are particularly beneficial for antimalarial studies addressing biocrystallization. The methods of the invention utilize light scattering, such as DDLS, with outlier connection in a straightforward assay in the example context of quinoline-class antimalarial chemotherapy, where the inhibition of heme self-assembly and crystal growth is the primary target. Given the principles of the technique, the approach is suitable for miniaturization and integration into microfluidic platforms and lab-on-a-chip assays,[19] where automation and parallelization for high-throughput is desired.[13] Furthermore, unlike other techniques,[20] depolarized light scattering enables a cost-effective design,[13] and fiber-optics based detection probes small volumes on the order of nanoliters.[21]

With the method of the present invention, real time observation and data collection regarding inhibition and/or enhancement on one or more precipitation and dissolution of a target compound can be studied, preferably in the presence of a potential therapeutic agent in one embodiment, wherein outliers can be accounted for and removed. Beneficially, the methods of the present invention including the process accounting for outliers makes analysis of heterogeneous samples possible. The observation of the effect of antimalarial quinolines on hemozoin formation is one embodiment of the method of data analysis using the method of the invention. Application of the methods of the invention is quite broad and can include for example analysis of substantially any biological fluids and tissues, such as, but not limited to, kidney stones, monosodium urate crystals, blood and blood components such as cholesterol, amyloid crystallites, Charcot-Leyden crystals, kidney tissue, brain tissue, etc.

To summarize, the methods of the present invention provide an excellent optical method for detecting and studying nano- and microcrystallites in impure media, enabling the observation of the effects of medications and pathogenetic crystals in real-time, for multiple diseases.

In one aspect, a method of analyzing and filtering light scattering data from a sample potentially containing a non-target compound is disclosed, comprising the steps of: A) obtaining a sample solution comprising a target compound, preferably a biological fluid sample, the target compound preferably able to one or more of precipitate from solution or dissolve in solution; B) performing a light scattering measurement on the sample solution and obtaining light scattering data; C) analyzing the light scattering data to determine if an outlier is present;

D) when at least one outlier is present, discarding at least one outlier to account for the non-target compound, and; E) after step D), analyzing the remaining light scattering data.

A further aspect includes the step of combining a test compound to be studied for one or more of an inhibiting and enhancing effect on one or more of precipitation and dissolution of the target compound.

An additional aspect includes analyzing the light scattering data, preferably photon counts, to determine a level to discard one or more outliers includes the steps of identifying and quantifying the mode of the photon count distribution, defined as the most likely value to find in a sample of a given set of photon counts, and using the peak of this modal distribution to eliminate outliers.

Yet another aspect includes establishing a probability interval, preferably greater than or equal to 0.95 and/or less than or equal to 0.99 and the corresponding value of n is defined as the threshold, wherein a cumulative distribution function of $$P(\alpha, \beta, n)\left(=1-\frac{\text{Gamma}\left[\alpha, \frac{n}{\beta}\right]}{\text{Gamma}[\alpha]}\right)$$

is used and any value of the time series above the threshold is discarded.

In a further aspect any remaining values are fit with $P(\alpha,\beta,n)$ to obtain a 'true' M and $\langle n \rangle$ corresponding to coherent fluctuations and Brownian motion.

An additional aspect includes analyzing the light scattering data, preferably photon counts, to determine a level to discard at least one outlier includes the steps of:
power transforming the photon counts: $y=n^F$, wherein F is a real number, wherein $$P(\alpha, \beta, y) = \frac{e^{-\frac{y^{\frac{1}{F}}}{\beta}} y^{-1+\frac{\alpha}{F}} \beta^{-\alpha}}{F \, \text{Gamma}[\alpha]}$$

where Gamma[$\alpha$] is the gamma function with argument $\alpha$, $\alpha$ and $\beta$ are $$\alpha = \frac{M\langle n\rangle}{M+\langle n\rangle} \text{ and } \beta = \frac{M+\langle n\rangle}{M};$$

when $\langle n \rangle \gg M$, $\alpha = M$ and $$\beta = \frac{\langle n \rangle}{M},$$

the mode of this distribution is $y=M^{-F}(M\langle n\rangle - F(M+\langle n\rangle))^F$, wherein when $\langle n\rangle \gg M \gg F$, $y \cong \langle n\rangle^F$, wherein F is chosen such that the skewness of the distribution of y becomes zero, and fitting a symmetric function against distribution of y determines the mode, wherein $\langle n \rangle$ is calculated from the mode, and thereafter fitting $P(\alpha,\beta,n)$ against a distribution of photon counts, constrained by knowing the value of $\langle n \rangle$, which is used to establish a probability interval, such as at least 0.95, or 0.99≥value>0.95 and the corresponding value of n is defined as the threshold, wherein the cumulative distribution function of $$P(\alpha, \beta, n)\left( = 1 - \frac{\text{Gamma}\left[\alpha, \frac{n}{\beta}\right]}{\text{Gamma}[\alpha]}\right)$$

is used and any value of the time series above the threshold is discarded.

In a further aspect the biological material is one or more of blood, synovial fluid, tissue (including, but not limited to, brain, liver, muscle, kidney, gall bladder) and urine.

The invention further includes performing the light scattering measurement utilizing static light scattering or dynamic light scattering.

Yet another aspect includes the step of observing, over a period of real-time, precipitation or dissolution of the target compound in the sample.

In still another aspect the target compound is one or more of heme, hemozoin, monosodium urate, a glass-like proteinaceous material, such as amyloid fibrils and crystallites, phosphate crystals, cholesterol, and Charcot-Leyden crystals.

In a further aspect the target compound is heme, and further including the step of initiating crystallization of heme by adding an initiator to the sample solution.

In another aspect, analyzing the data includes the step of determining if the test compound inhibits formation of at least one target compounds.

In a further aspect the sample solution includes at least one test compound to be studied for the ability to inhibit precipitation or dissolution of a crystal, and analyzing the data includes the step of observing an effect of the test compound on crystal precipitation or dissolution.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

In the following section, procedures and devices used to screen potential drugs, e.g. antimalarial drugs, are described. Variations in steps and/or components may be utilized by one of ordinary skill in the art.

Figure 1:
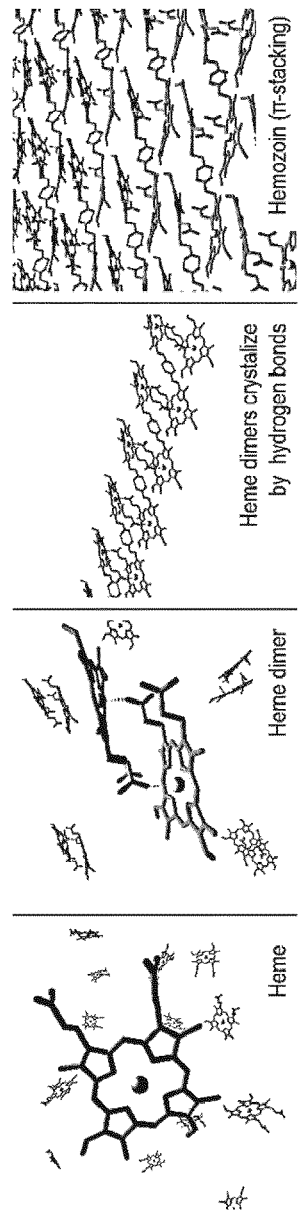
FIG. 1 illustrates biocrystallization of heme through dimerization and self-assembly into hemozoin. The heme molecule has a planar structure, and produces centrosymmetric μ-propionate dimers to generate the basic unit of hemozoin crystals. Then, β-hematin is formed by reciprocal hydrogen bonds between carboxylic acid groups, forming a supramolecular polymer which self-assembles by regular π-stacking.
Figure 2:
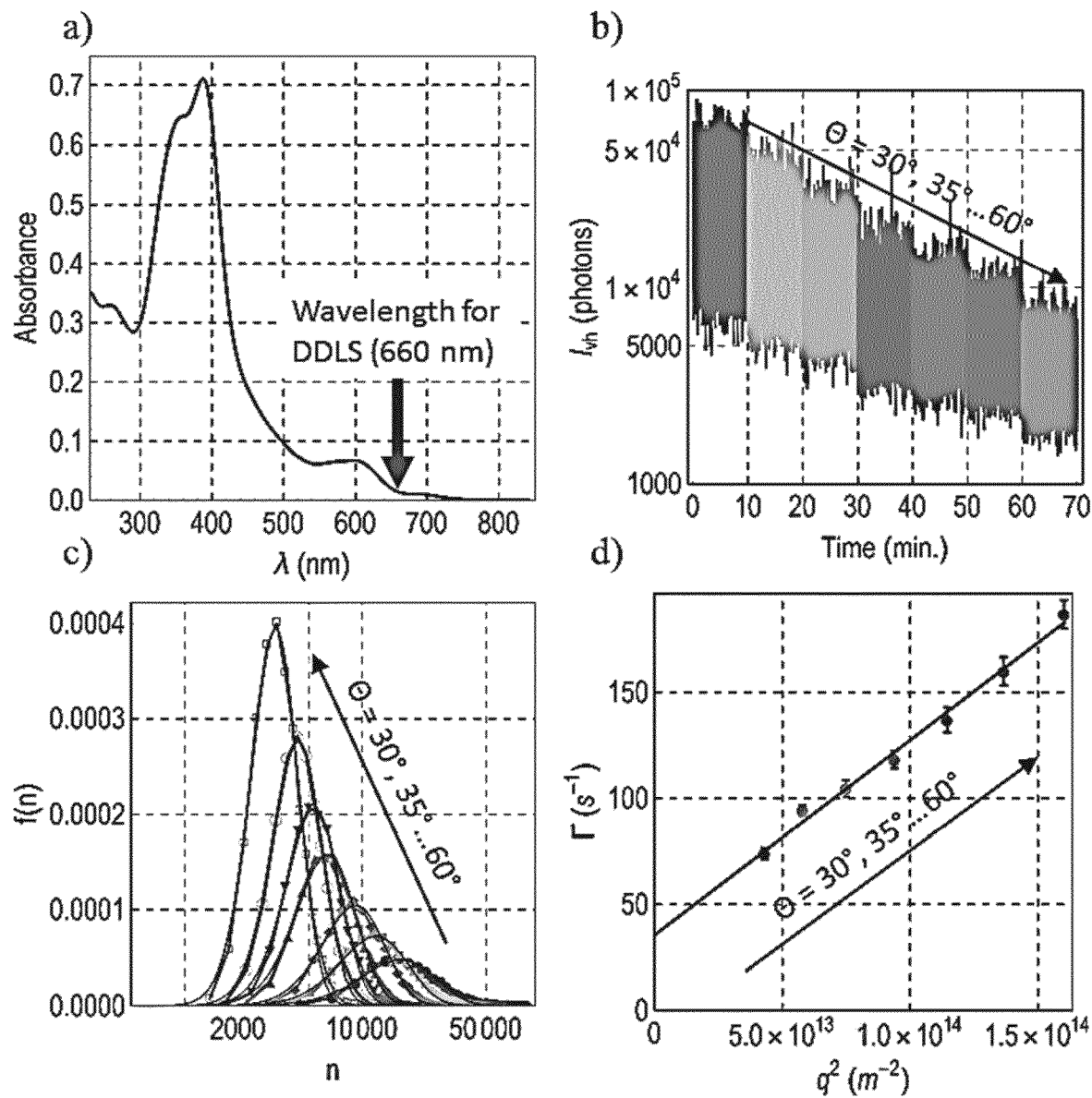
FIG. 2 illustrates a) UV-Vis optical extinction spectrum of β-hematin suspended in water. To collect DDLS data, we used a laser wavelength of λ=660 nm, where light absorption is low. b) Stream of photon counts recorded consecutively at different scattering angles. c) The corresponding photon count distributions. d) The $q^2$-dependence of the Brownian dynamics of the β-hematin crystals, determined from the photon counts. The data points define a straight line with a nonzero intercept. The solid line is the best linear fit that determines a hydrodynamic radius of $R_H$=309±10 nm (estimate±standard error).
Figure 3:
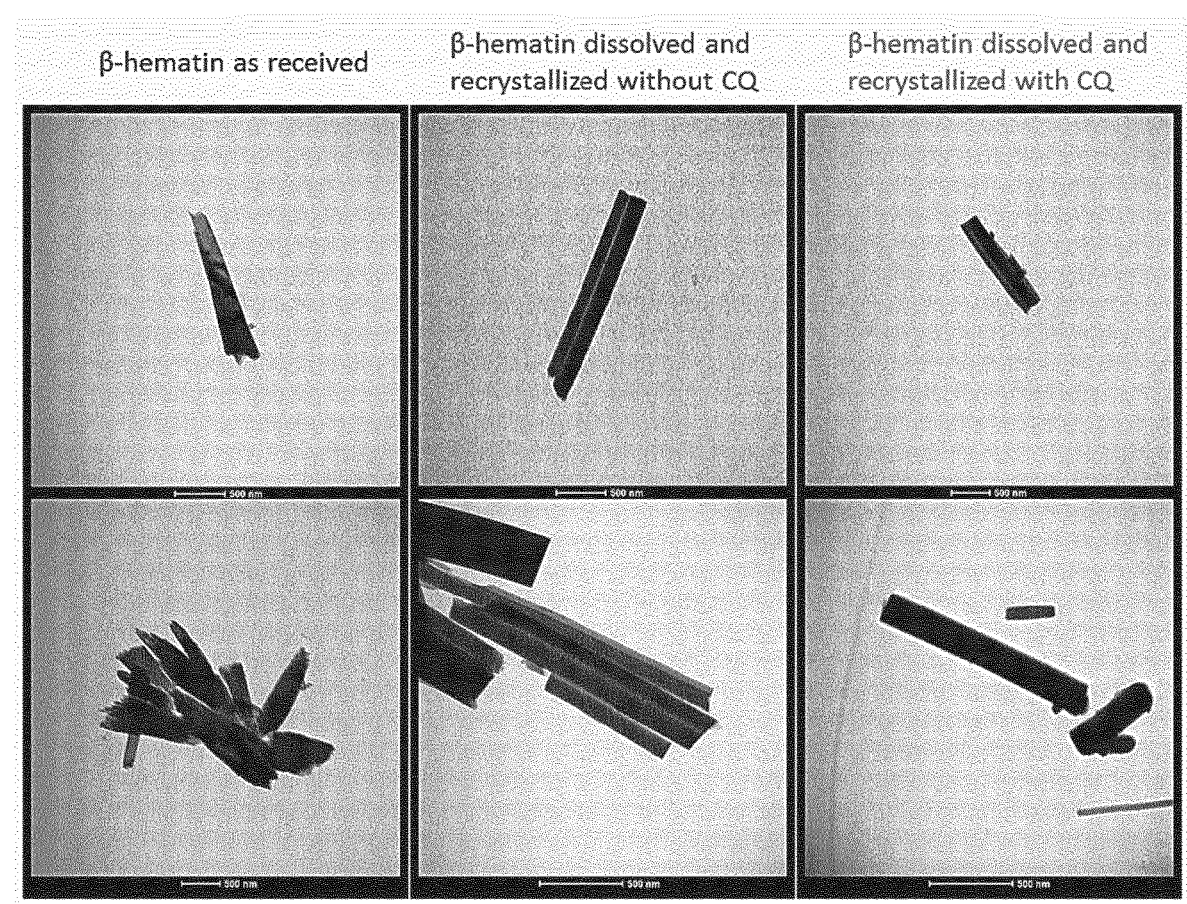
FIG. 3 illustrates TEM micrographs of β-hematin samples. The scale-bars mark 500 nm.
Figure 4:
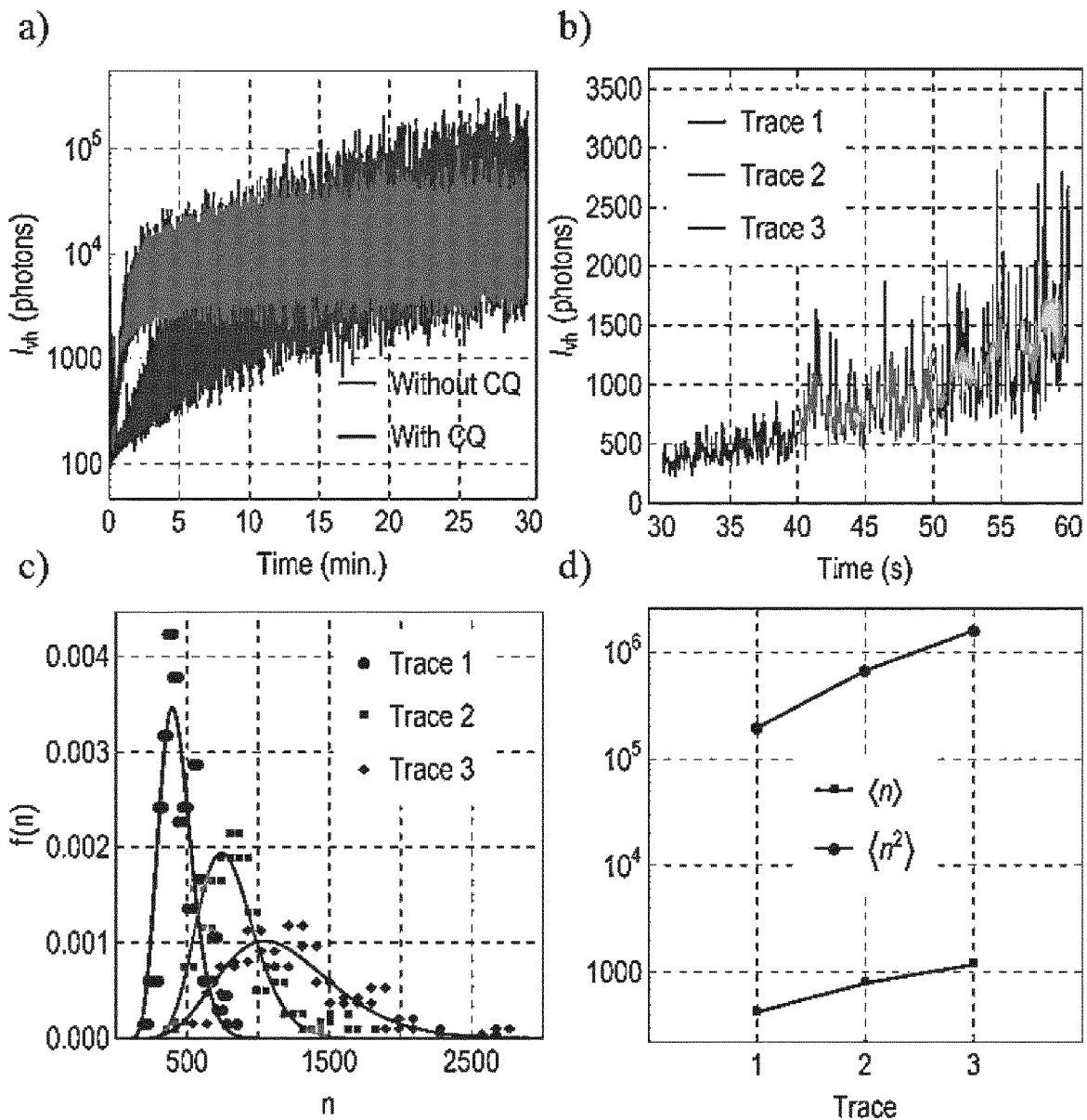
FIG. 4 illustrates a) The traces of photon counts recorded during recrystallization of β-hematin with and without CQ. b) A 30-second-long period of the photon count trace (with CQ) divided into three equal parts. c) The corresponding photon count distributions, and d) their first two raw moments.
Figure 5:
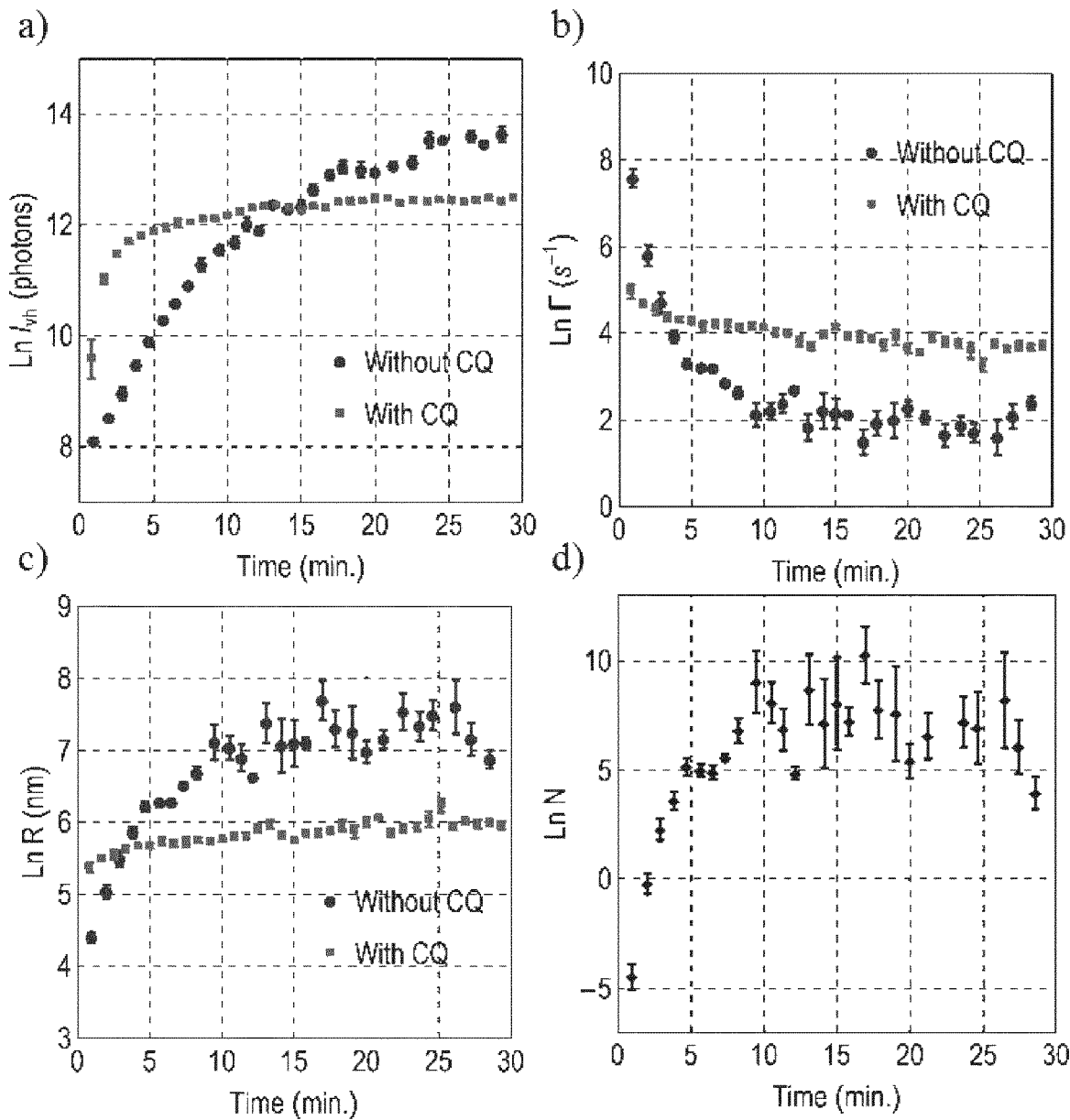
FIG. 5 illustrates: The crystallization kinetics of β-hematin without and in the presence of CQ. a) The natural logarithm of the mean scattering intensity as a function of crystallization time. b) The natural logarithm of the relaxation rate as a function of crystallization time. c) The natural logarithm of the hydrodynamic radius as a function of crystallization time. d) The natural logarithm of the relative number of β-hematin crystals: $N=C_{with\ CQ}/C_{wo\ CQ}$, where C denotes the concentration of the crystal nuclei formed without and in the presence of CQ. For the sake of clarity, the data points on each panel present the average of five measurements, and the error bars present the standard errors.
Figure 6:
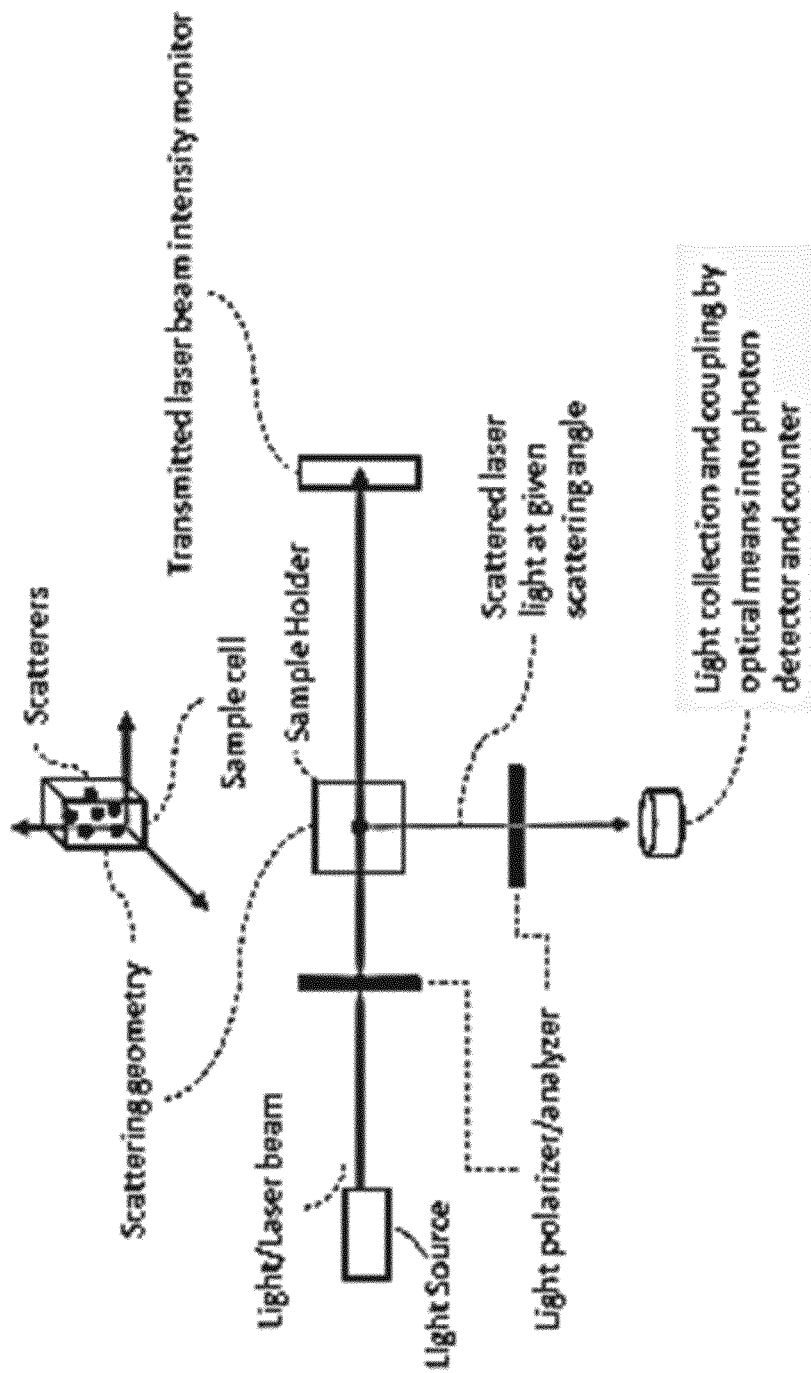
FIG. 6 illustrates a schematic diagram of one embodiment of a device that can be utilized to perform the methods of the invention.

The methods of the present invention analyze statistical properties of light scattered from a given sample and identifies and removes one or more outliers in the light scattering data. In order to perform the methods of the present invention, a device or system that includes a coherent light source, a sample holder, a light collection device and a photon counter is obtained or fabricated, as known in the art. See FIG. 6 for one embodiment of a screening system of the present invention. In one embodiment, a sample in the sample holder is illuminated with the light source. Photons of the scattered light are coupled into the photon counter by the light collection device and counted at a desired angle, for example at 90° as illustrated in FIG. 6, perpendicular to the light source and perpendicular to the long axis of the sample holder. Photons are counted at a given integration time, consecutively for a period of time, for example about 10 seconds. Statistical properties of the obtained data are analyzed in order to describe crystallization.

The light source preferably produces a spatially and temporally coherent light. In a preferred embodiment, the light source is a laser that produces a stable and collimated laser beam. In a preferred embodiment, the wavelength of the light is chosen so that the light absorption of the crystallizing substance is low. A suitable laser is available as a Cobolt 05-01 diode pumped solid state laser.

The sample holder utilized in the present invention can accommodate single or multiple samples. The sample holder in one embodiment is a glass tube. Laminar flow (for example, in flow cells) can be used, where, ideally, the velocity vector of the flow is perpendicular to the plane defined by the axes of the laser beam and scattering (as indicated in FIG. 6). Other suitable sample holders allowing desired measurements to be performed on the solution can be utilized.

The light collection device of the invention is utilized to couple scattered light into the photon counter. Light collection device can comprise an assembly of various optical lenses and fibers, a polarization filter/analyzer and collector. A suitable light spectrometer (3D LS Spectrometer) is available from LS Instruments AG, of Switzerland. Scattered light may be collected utilizing single-mode optical fibers equipped with integrated collimation optics and a laser-line filter corresponding to the wavelength of the laser. Depolarized scattering can be observed via cross-polarizes. In one embodiment, the incoming beam passes through an intensity filter, a polarizer, such as a Glan-Thomson polarizer with an extinction ratio of $10^{-6}$ and another Glan-Thompson polarizer with an extinction ratio of $10^{-6}$ is mounted in front of the collection optics as illustrated in FIG. 6.

The photons are counted with a photon counter, such as an avalanche photo diode detector, for example a Single Photon Counting Module (SPCM-AQR) available from Perkin and Elmer. In one embodiment the photon counts are obtained at a sampling rate of 19 Hz, however the sampling rate may be varied on a wide range, typically between $10^{-6}$ and 1 s.

Figure 7:
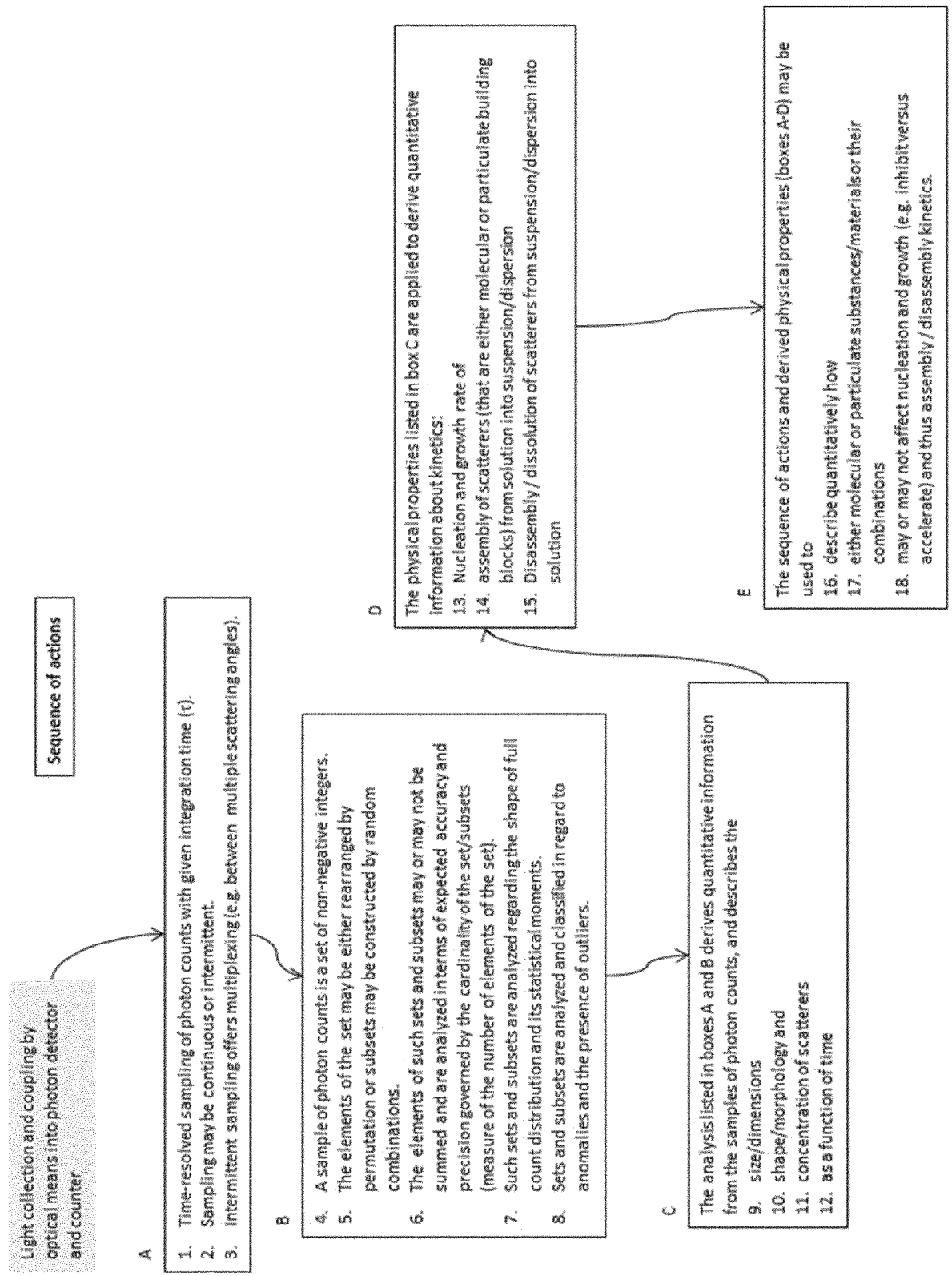
FIG. 7 illustrates a flow diagram of a sequence of actions that can be utilized to perform the methods of the invention.
Figure 8:
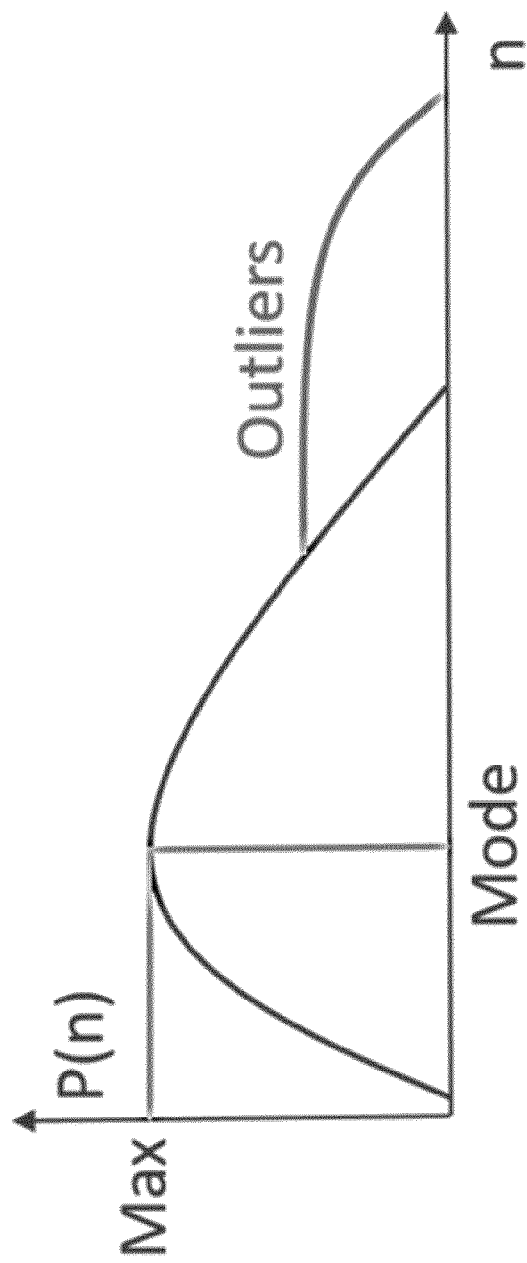
FIG. 8 graphically illustrates identifying the mode of distribution and accounting for outliers.
Figure 9:
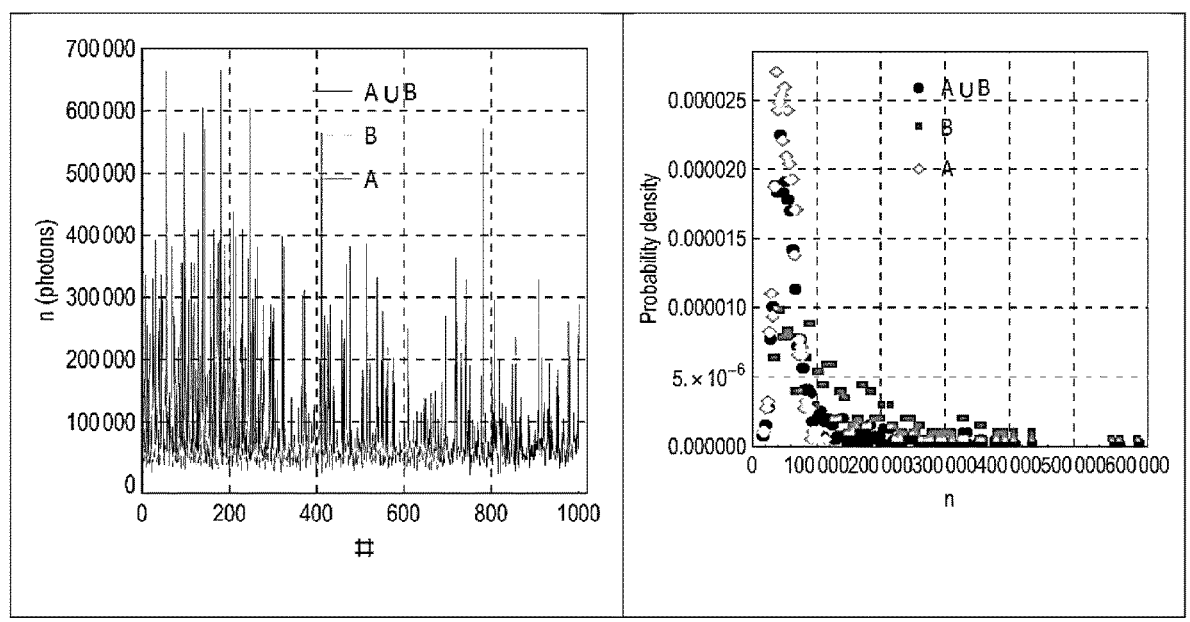
FIG. 9 illustrates various graphs wherein A represents good data, B represents outliers, and A∪B represents the union of good and outlier data. The goal is to retrieve the parameters of A, after running the algorithm on A∪B, and the corresponding PDFs. The level of noise is 30%.
Figure 10:
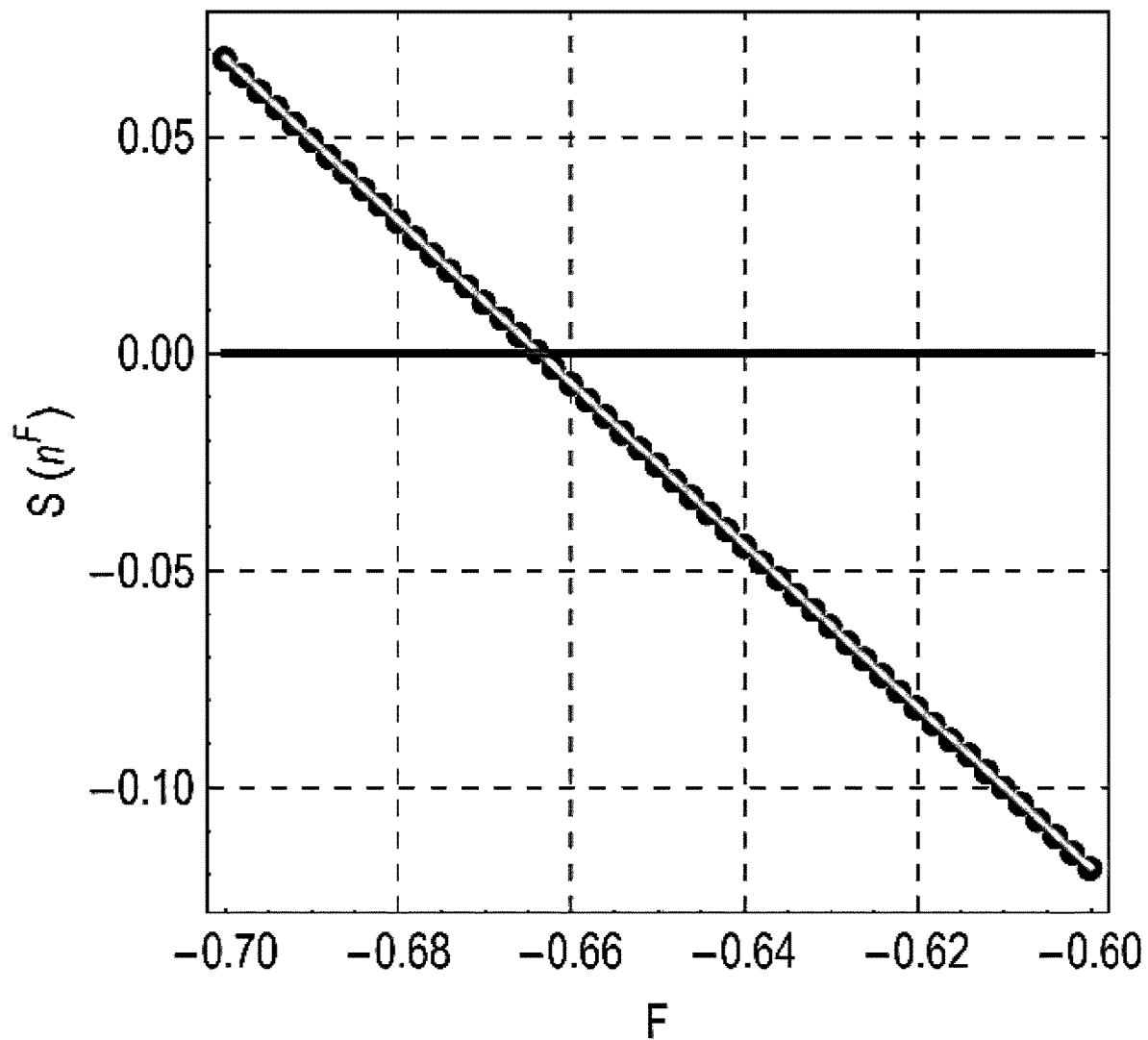
FIG. 10 is a graph illustrating the search for zero skewness via power transformation.
Figure 11:
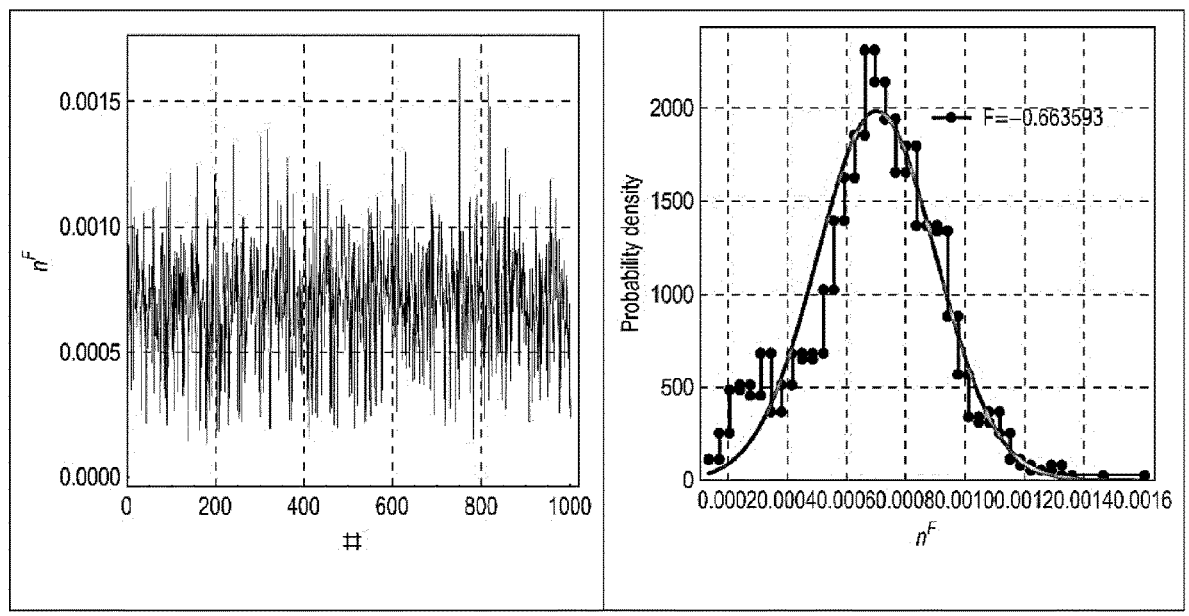
FIG. 11 illustrates the power transform of A∪B, using F, and the corresponding symmetric distribution and Gaussian fit.
Figure 12:
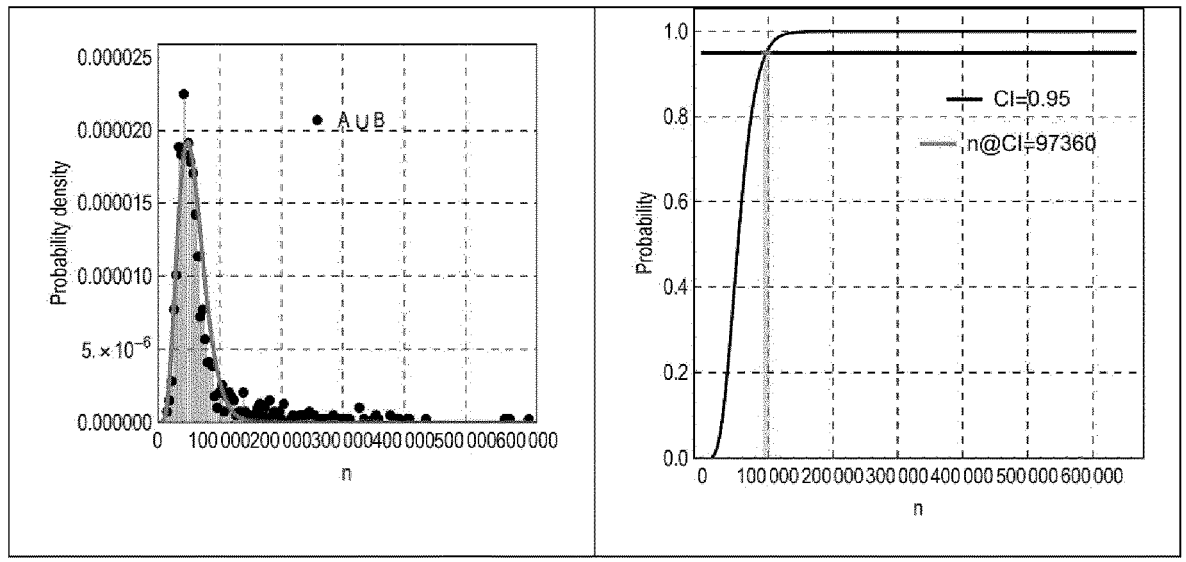
FIG. 12 illustrates the fit A∪B using the mode-defined mean value (⟨n⟩), and defining the confidence interval.
Figure 13:
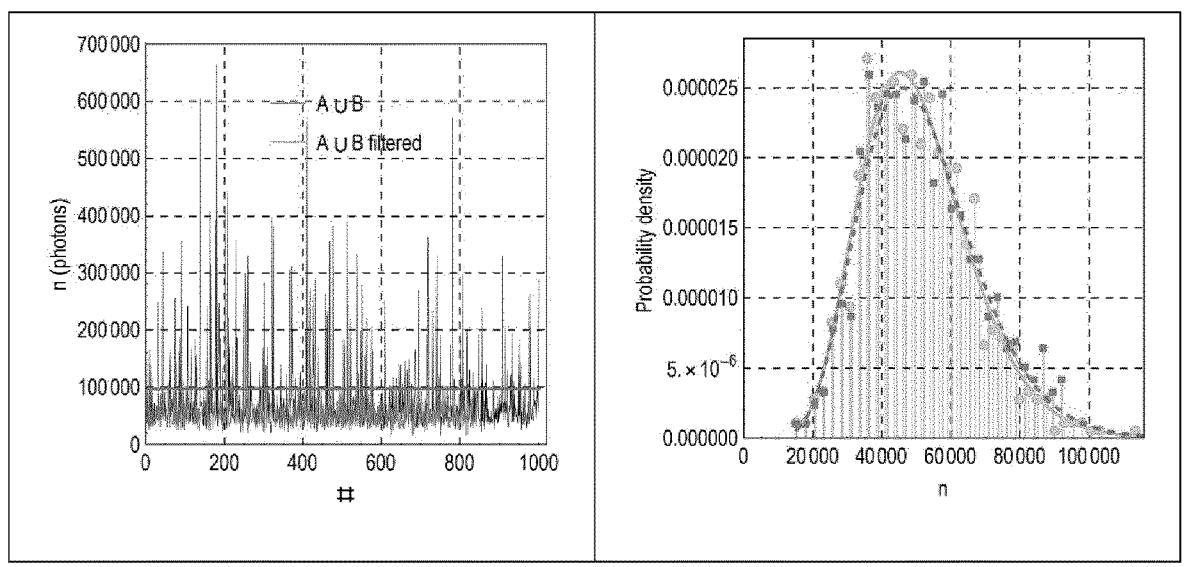
FIG. 13 illustrates filtering the time series, and fitting the corresponding PDF (green: original clean data, magenta: filtered colored data), wherein the analysis of the clean data (A) results in (M, ⟨n⟩)=(10, 50522), and wherein the analysis of the data (A∪B) after the algorithm/filter results in (9.55, 51634).
Figure 14:
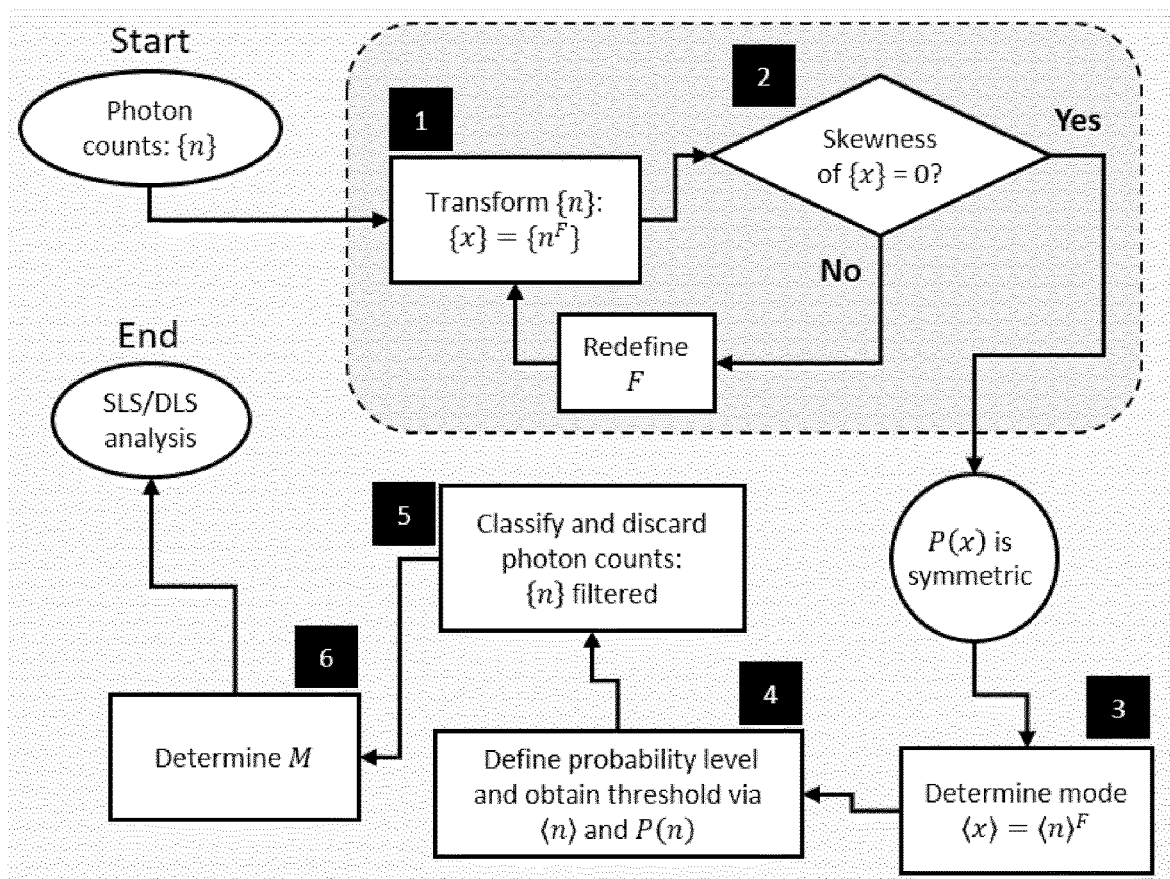
FIG. 14 is a flow chart showing one process used to identify, classify and remove one or more outliers.

FIG. 7 presents a flow diagram describing a sequence of actions relating to the manner of analyzing the statistical properties of the light scattered from a particular sample. The following steps can be utilized after the scattered light has been collected and coupled by optical means into the photon detector and counter. As set forth in box A, time-resolved sampling of photon counts can be performed with a given integration time ($\tau$). Sampling of the photon counts may be continuous or intermittent. With intermittent sampling, multiplexing, for example between multiple scattering angles, can be performed.

The data provided by sampling of photon counts is a set of non-negative integers. The elements of the set may be rearranged by permutation and subsets may be constructed by random combinations. The elements of such sets and subsets may or may not be summed and are analyzed in terms of expected accuracy and precision governed by the cardinality of the set/subsets (measure of the number of elements of the set). Such sets and subsets are analyzed regarding the shape of full count distribution and its statistical moments. Sets and subsets are analyzed in regard to anomalies and the presence of the outliers as described herein.

As noted in box C, quantitative data or information from the sampling of photon counts is provided by the analysis described in boxes A and B. Information obtained may include one or more of i) the size and/or dimensions of the light scattering compound, ii) shape and/or morphology of the light scattering compound, and iii) concentration of the scattering compound; each as a function of time on the basis of the multiple measurements performed.

As further characterized in box D, the physical properties of the light scattering compounds described in box C are used to derive quantitative information about kinetics, such as nucleation and growth rate of the light scattering compounds, assembly of the light scattering compounds from solution into a suspension/dispersion as well as disassembly or dissolution of the light scattering compounds from a suspension or dispersion into a solution.

The steps performed on the scattered light and properties determined from the analysis thereof may be used, for example as described in box E, to quantitatively describe how the light scattering compound, which can be a molecular substance, particulate substance or material or a combination thereof, may or may not affect nucleation and growth, e.g. inhibit vs accelerate and thus assembly and/or disassembly kinetics.

Hemozoin Crystallization Analysis

The methods of the present invention are illustrated, using a specific, non-limiting embodiment, to determine the capacity of one or more compounds to inhibit the formation of hemozoin crystals. Successful compounds may be suitable candidates for use as antimalarial drugs.

The screening process is started by obtaining a solution comprising heme.

In one embodiment, heme is prepared by dissolving biocrystals resulting from heme dimerization and self-assembly as known in the art and described herein below in the example section. The solution must be of high optical transmittance, so that multiple light scattering occurs with a low probability. Concentration range of heme in solution can vary depending upon the technical parameters of the testing system or device utilized, for example light source power, sample holder size, etc.

A desired quantity of the solution including heme is placed in a suitable sample holder described above.

In a further step, one or more compounds to be tested for ability to inhibit formation of hemozoin crystals are combined with the sample solution including heme. The amount of the compound utilized can vary depending upon the arrangement of the testing device.

Thereafter an initiator known in the art to be capable of initiating crystallization of heme to hemozoin is added to the sample solution. Acetic acid is utilized in one embodiment.

The sample holder is placed in a desired location within the testing device. As described hereinabove, the light source illuminates the sample or samples in a sequential manner and the photons of the scattered light are coupled into the photon counter by the light collection assembly and counted. Thereafter, the statistical properties are analyzed in order to characterize the crystallization.

EXAMPLES

Synthetic hemozoin (sHz) was purchased from InvivoGen (San Diego, Calif.) and was used as received. Sodium hydroxide (≥98%), chloroquine diphosphate salt (≥98%) (CQ), and acetic acid (≥99.7%) were purchased from Sigma Aldrich. sHz was suspended in ultrapure water. Ultrapure water was obtained from a Purelab Flex II (Veolia water system) with a resistance of 18.2 mΩ, and an LC208 purification pack. The ultrapure water was filtered with a Nylon 66 syringe filter with a pore size of 0.22 µm (BGB Analytik, Switzerland). 0.10 mg (0.15 mmol) of sHz were weighted in a glass vial and were suspended in 3 mL of the filtered water. To a standard cell culture glass tube, 3 mL of the filtered water were introduced, and 200 µL of the sHz suspension were added yielding a suspension with a concentration of 2.22 µg mL$^{-1}$ (3.44 nmol mL$^{-1}$). The suspension was sonicated for three minutes in a sonicator bath (Sonoswiss SW3) to yield a homogeneous suspension of non-aggregated crystals. The crystallization of hemozoin was achieved by employing the procedure described in Blauer, G.; Akkawi, M., On the preparation of β-haematin. *Biochemical Journal* 2000, 346 (2), 249-250, herein fully incorporated by reference.[22] Briefly, a stock solution of hemozoin was prepared by dissolving 0.10 mg (0.15 µmol) sHz in 1 mL of 0.4 M sodium hydroxide. The latter was diluted ten times in 0.4 M sodium hydroxide to generate a second stock solution. Individually, 0.7 mL of each stock solution was aliquoted into two different cell culture glass tubes. To each test tube, 0.62 mL of ultrapure water was added. The crystallization of heme to form hemozoin was initiated by the addition of 0.68 mL of acetic acid. The final pH of the solution was 2.9. To observe the influence of CQ in the crystallization kinetics, the same procedure as for the crystallization of isolated heme was employed, but pure acetic acid was substituted by a solution of 20.60 mg mL-1 (64.41 µmol mL-1) of CQ. The final CQ concentration in the crystallization reactions was 0.66 mg ml-1 (2.08 µmol mL-1).

The UV-Vis measurement was performed on an Analytik Jena Specord 50 Plus spectrophotometer, using a disposable semi-micro poly(methyl methacrylate) cuvette (path length: 1 cm).

Transmission electron microscopy (TEM) images were obtained using a FEI Tecnai Spirit at 120 kV. The images were recorded at a resolution of 2048×2048 pixels (Veleta CCD camera, Olympus). In the case of the imaging of hemozoin yielded from the crystallization reactions, the same conditions as in the DDLS experiments were employed. Then, the reaction volume was filtered with a syringe filter, and the filtrate was extensively washed with ultrapure water. Then, the crystals were retrieved by smearing the filter with 1 mL of ultrapure water. 5 µl of the hemozoin suspensions were drop-casted onto a carbon-film square mesh copper grid (Electron Microscopy Sciences, CF-300-Cu) and the solvent was allowed to dry overnight.

Light scattering data were collected at constant temperature (21° C.) using a commercial goniometer instrument (3D LS Spectrometer, LS Instruments AG, Switzerland). The primary beam was formed by a linearly polarized and collimated laser beam (Cobolt 05-01 diode pumped solid state laser, λ=660 nm, $P_{max}$=500 mW), and the scattered light was collected by single-mode optical fibers equipped with integrated collimation optics. With respect to the primary beam, depolarized scattering was observed via cross-polarizers. The incoming laser beam passed through a Glan-Thompson polarizer with an extinction ratio of $10^{-6}$, and another Glan-Thompson polarizer, with an extinction ratio of $10^{-8}$, was mounted in front of the collection optics. The collected light was coupled into an avalanche photo diode detector (Perkin Elmer, Single Photon Counting Module) via laser-line filters. The photon counts were obtained at a sampling rate of 19 Hz, which corresponded to an integration time of ~0.05 s, and defined the lower limit of the available integration times.

For the avoidance of doubt, the compositions of the present invention encompass all possible combinations of the components, including various ranges of said components, disclosed herein. It is further noted that the term "comprising" does not exclude the presence of other elements. However, it is to also be understood that a description of a product or composition comprising certain components also discloses a product consisting of said components. Similarly, it is also to be understood that a description of a process comprising certain steps also discloses a process consisting of the steps.

In accordance with the patent statutes, the best mode and preferred embodiment have been set forth; the scope of the invention is not limited thereto, but rather by the scope of the attached claims.

REFERENCES

1. Murray, C. J. L.; Rosenfeld, L. C.; Lim, S. S.; Andrews, K. G.; Foreman, K. J.; Haring, D.; Rittman, N.; Naghavi, M.; Lozano, R.; Lopez, A. D., Global malaria mortality between 1980 and 2010: a systematic analysis. *Lancet* 2012, 379 (9814), 413-431.
2. Hemozoin: a Biocrystal Synthesized during the Degradation of Hemoglobin. In *Biopolymers Online*.
3. Coronado, L. M.; Nadovich, C. T.; Spadafora, C., Malarial hemozoin: From target to tool. *Biochimica et Biophysica Acta (BBA)—General Subjects* 2014, 1840 (6), 2032-2041.
4. Sigala, P. A.; Goldberg, D. E., The Peculiarities and Paradoxes of *Plasmodium* Heme Metabolism. *Annual Review of Microbiology* 2014, 68 (1), 259-278.
5. Weissbuch, I.; Leiserowitz, L., Interplay Between Malaria, Crystalline Hemozoin Formation, and Antimalarial Drug Action and Design. *Chemical Reviews* 2008, 108 (11), 4899-4914.
6. Klein, E. Y., Antimalarial drug resistance: a review of the biology and strategies to delay emergence and spread. *International Journal of Antimicrobial Agents* 2013, 41 (4), 311-317.
7. White, N. J., Antimalarial drug resistance. *The Journal of Clinical Investigation* 2004, 113 (8), 1084-1092.
8. Sinha, S.; Sarnia, P.; Sehgal, R.; Medhi, B., Development in Assay Methods for in Vitro Antimalarial Drug Efficacy Testing: A Systematic Review. *Frontiers in Pharmacology* 2017, 8 (754).
9. Fidock, D. A.; Rosenthal, P. J.; Croft, S. L.; Brun, R.; Nwaka, S., Antimalarial drug discovery: efficacy models for compound screening. *Nature Reviews Drug Discovery* 2004, 3, 509.
10. Gildenhuys, J.; Roex, T. I.; Egan, T. J.; de Villiers, K. A., The Single Crystal X-ray Structure of β-Hematin DMSO Solvate Grown in the Presence of Chloroquine, a β-Hematin Growth-Rate Inhibitor. *Journal of the American Chemical Society* 2013, 135 (3), 1037-1047.
11. Pagola, S.; Stephens, P. W.; Bohle, D. S.; Kosar, A. D.; Madsen, S. K., The structure of malaria pigment β-haematin. *Nature* 2000, 404, 307.
12. Pandey, A. V.; Singh, N.; Tekwani, B. L.; Puri, S. K.; Chauhan, V. S., Assay of β-hematin formation by malaria parasite. *Journal of Pharmaceutical and Biomedical Analysis* 1999, 20 (1), 203-207.
13. Bossert, D.; Natterodt, J.; Urban, D. A.; Weder, C.; Petri-Fink, A.; Balog, S., Speckle-Visibility Spectroscopy of Depolarized Dynamic Light Scattering. *The Journal of Physical Chemistry B* 2017, 121 (33), 7999-8007.

14. Bossert, D.; Crippa, F.; Petri-Fink, A.; Balog, S., Hypothesis Test of the Photon Count Distribution for Dust Dis-crimination in Dynamic Light Scattering. 2018.
15. Goodman, J. W., *Statistical Optics*. Wiley: 2000.
16. Pecora, R., *Dynamic Light Scattering: Applications of Photon Correlation Spectroscopy*. Plenum Press: New York, 1985.
17. Barber, P. W.; Wang, D.-S., Rayleigh-Gans-Debye applicability to scattering by nonspherical particles: corrigenda. *Appl. Opt.* 1979, 18 (7), 962-963.
18. Sullivan, D. J.; Gluzman, I. Y.; Russell, D. G.; Goldberg, D. E., On the molecular mechanism of chloroquine's antimalarial action. *P Natl Acad Sci USA* 1996, 93 (21), 11865-11870.
19. Kolluri, N.; Klapperich, C. M.; Cabodi, M., Towards lab-on-a-chip diagnostics for malaria elimination. *Lab on a Chip* 2018, 18 (1), 75-94.
20. Sandlin, R. D.; Fong, K. Y.; Wicht, K. J.; Carrell, H. M.; Egan, T. J.; Wright, D. W., Identification of β-hematin inhibitors in a high-throughput screening effort reveals scaffolds with in vitro antimalarial activity. *International Journal for Parasitology: Drugs and Drug Resistance* 2014, 4 (3), 316-325.
21. Gisler, T.; Rüger, H.; Egelhaaf, S. U.; Tschumi, J.; Schurtenberger, P.; Rička, J., Mode-selective dynamic light scattering: theory versus experimental realization. *Appl. Opt.* 1995, 34 (18), 3546-3553.
22. Blauer, G.; Akkawi, M., On the preparation of β-haematin. *Biochemical Journal* 2000, 346 (2), 249-250.

What is claimed is:

1. A method of analyzing and filtering light scattering data from a sample potentially containing a non-target compound, comprising the steps of:
   A) obtaining a sample solution comprising a biological material comprising a target compound, the target compound preferably able to one or more of precipitate from solution or dissolve in solution;
   B) performing a light scattering measurement on the sample solution and obtaining light scattering data;
   C) analyzing the light scattering data to determine if an outlier is present;
   D) when at least one outlier s present, discarding at least one outlier to account for the non-target compound, and;
   E) after step D), analyzing the remaining light scattering data,
   wherein analyzing the light scattering data to determine a level to discard the at least one outlier includes the steps of analyzing photon counts, identifying and quantifying the mode of the photon count distribution, defined as the most likely value to find in a sample of a given set of photon counts, and using the mode of the photon count distribution to eliminate the at least one outlier.

2. The method according to claim 1, further including the step of combining a test compound to be studied for one or more of an inhibiting and enhancing effect on one or more of precipitation and dissolution of the target compound.

3. The method according to claim 2, further including establishing a probability interval, preferably greater than or equal to 0.95, and/or less than or equal to 0.99 and the corresponding value of n is defined as the threshold, wherein the cumulative distribution function of $$P(\alpha, \beta, n) \left( = 1 - \frac{\text{Gamma}\left[\alpha, \frac{n}{\beta}\right]}{\text{Gamma}[\alpha]} \right)$$

is used and any value of the time series above the threshold is discarded,
   wherein any remaining values are fit with $P(\alpha,\beta,n)$ to obtain a 'true' M and $\langle n \rangle$ corresponding to coherent fluctuations and Brownian motion, wherein analyzing the photon counts distributions to determine a level to discard at least one outlier includes the steps of:
   power transforming the photon counts: $y=n^F$, wherein F is a real number, wherein wherein analyzing the photon count distribution to determine a level to discard at least one outlier includes the steps of:
   power transforming the photon counts: $y=n^F$, wherein F is a real number, wherein $$P(\alpha, \beta, y) = \frac{e^{-y\frac{1}{\beta}} y^{-1+\frac{\alpha}{F}} \beta^{-\alpha}}{F \text{ Gamma}[\alpha]}$$

where $\text{Gamma}[\alpha]$ is the gamma function with argument $\alpha$, $\alpha$ and $\beta$ are $$\alpha = \frac{M \langle n \rangle}{M + \langle n \rangle} \text{ and } \beta = \frac{M + \langle n \rangle}{M};$$

when $\langle n \rangle \gg M$, $\alpha = M$ and $$\beta = \frac{\langle n \rangle}{M},$$

the mode of this distribution is $y=M^{-F}(M \langle n \rangle - F(M+\langle n \rangle))^F$, wherein when $\langle n \rangle \gg M \gg F$, $y=\langle n \rangle^F$, wherein F is chosen such that the skewness of the distribution of y becomes zero, and fitting a symmetric function against distribution of y determines the mode, wherein $\langle n \rangle$ is calculated from the mode, and thereafter fitting $P(\alpha,\beta,n)$ against a distribution of photon counts, constrained by knowing the value of $\langle n \rangle$, which is used to establish a probability interval, such as at least 0.95, or 0.99 value >0.95 and the corresponding value of n is defined as the threshold, wherein the cumulative distribution function of $$P(\alpha, \beta, n) \left( = 1 - \frac{\text{Gamma}\left[\alpha, \frac{n}{\beta}\right]}{\text{Gamma}[\alpha]} \right)$$

is used and any value of the time series above the threshold is discarded.

4. The method according to claim 3, wherein performing the light scattering measurement utilizes static light scattering or dynamic light scattering.

5. The method according to claim 4, further including the step of observing, over a period of real-time, precipitation or dissolution of the target compound in the sample.

6. The method according to claim 5, wherein the target compound is one or more of heme, hemozoin, monosodium urate, a glass-like proteinaceous material, amyloid fibrils, crystallites, phosphate crystals, cholesterol, and Charcot-Leyden crystals.

7. The method according to claim 6, when the target compound is heme, and further including the step of initiating crystallization of heme by adding an initiator to the sample solution.

8. The method according to claim 2, wherein the biological material is one or more of blood, synovial fluid, tissue (including, but not limited to, brain, liver, muscle, kidney, gall bladder) and urine.

9. The method according to claim 1, further including establishing a probability interval, preferably greater than or equal to 0.95 and/or less than or equal to 0.99 and the corresponding value of n is defined as the threshold, wherein a cumulative distribution function of $$P(\alpha, \beta, n)\left(=1-\frac{\text{Gamma}\left[\alpha, \frac{n}{\beta}\right]}{\text{Gamma}[\alpha]}\right)$$

is used and any value of the time series above the threshold is discarded.

10. The method according to claim 9, wherein any remaining values are fit with $P(\alpha,\beta,n)$ to obtain a 'true' M and $\langle n \rangle$ corresponding to coherent fluctuations and Brownian motion.

11. The method according to claim 10, wherein analyzing the photon count distributions to determine a level to discard the at least one outlier includes the steps of:
power transforming the photon counts: $y=n^F$, wherein F is a real number, wherein $$P(\alpha, \beta, y) = \frac{e^{-\frac{y^{\frac{1}{F}}}{\beta}} y^{-1+\frac{\alpha}{F}} \beta^{-\alpha}}{F\, \text{Gamma}[\alpha]}$$

where Gamma[α] is the gamma function with argument α, a and β are $$\alpha = \frac{M\langle n \rangle}{M+\langle n \rangle} \text{ and } \beta = \frac{M+\langle n \rangle}{M};$$

when $\langle n \rangle \gg M$, α=M and $$\beta = \frac{\langle n \rangle}{M},$$

the mode of this distribution is $y=M^{-F}(M\langle n \rangle - F(M+\langle n \rangle))^F$, wherein when $\langle n \rangle \gg M \gg F$, $y=\langle n \rangle^F$, wherein F is chosen such that the skewness of the distribution of y becomes zero, and fitting a symmetric function against distribution of y determines the mode, wherein $\langle n \rangle$ is calculated from the mode, and thereafter fitting $P(\alpha,\beta,n)$ against a distribution of photon counts, constrained by knowing the value of $\langle n \rangle$, which is used to establish a probability interval, such as at least 0.95, or 0.99≥value >0.95 and the corresponding value of n is defined as the threshold, wherein the cumulative distribution function of $$P(\alpha, \beta, n)\left(=1-\frac{\text{Gamma}\left[\alpha, \frac{n}{\beta}\right]}{\text{Gamma}[\alpha]}\right)$$

is used and any value of the time series above the threshold is discarded.

12. The method according to claim 1, wherein the biological material is one or more of blood, synovial fluid, tissue (including, but not limited to, brain, liver, muscle, kidney, gall bladder) and urine.

13. The method according to claim 1, wherein performing the light scattering measurement utilizes static light scattering or dynamic light scattering.

14. The method according to claim 1, further including the step of observing, over a period of real-time, precipitation or dissolution of the target compound in the sample.

15. The method according to claim 14, wherein the target compound is one or more of heme, hemozoin, monosodium urate, a glass-like proteinaceous material, amyloid fibrils, crystallites, phosphate crystals, cholesterol, and Charcot-Leyden crystals.

16. The method according to claim 15, when the target compound is heme, and further including the step of initiating crystallization of heme by adding an initiator to the sample solution.

17. The method according to claim 15, wherein analyzing the data includes the step of determining if the test compound inhibits formation of at least one of heme, hemozoin, monosodium urate, a glass-like proteinaceous material, amyloid fibrils, crystallites, phosphate crystals, cholesterol, and Charcot-Leyden crystals.

18. The method according to claim 1, wherein the sample solution includes at least one test compound to be studied for the ability to inhibit precipitation or dissolution of a crystal that is one or more heme, hemozoin, monosodium urate, a glass-like proteinaceous material, amyloid fibrils, crystallites, phosphate crystals, cholesterol, and Charcot-Leyden crystals, and analyzing the data includes the step of observing an effect of the test compound on crystal precipitation or dissolution.

19. The method according to claim 1, wherein the non-target compound is an impurity, dust or a non-target substance.

* * * * *